United States Patent
Bullock et al.

[15] 3,673,206
[45] June 27, 1972

[54] RACEMIZATION OF d(+) 6-PHENYL-2,3,5,6-TETRAHYDROIMIDAZO [2,1-b]THIAZOLE

[72] Inventors: Milon Walker Bullock, Hopewell; John James Hand, Trenton, both of N.J.

[73] Assignee: American Cyanamid Company, Stamford, Conn.

[22] Filed: April 2, 1969

[21] Appl. No.: 812,917

Related U.S. Application Data

[63] Continuation-in-part of Ser. No. 565,101, July 14, 1966, abandoned.

[52] U.S. Cl. .......................................................260/306.7
[51] Int. Cl. ...........................................................C07d 99/10
[58] Field of Search ...............................................260/306.7

[56] References Cited

UNITED STATES PATENTS

| | | | |
|---|---|---|---|
| 3,274,209 | 9/1966 | Raeymaekers | 260/306.7 |
| 3,478,047 | 11/1969 | Doyle et al. | 260/306.7 |

OTHER PUBLICATIONS

Finar, Organic Chemistry, Vol. 2, Longmans, (1960), pp. 54–7.
Gilman, Organic Chemistry, Vol. 1, Wiley, (1957), pp. 241–245.
Wholand, Advanced Organic Chemistry, Wiley, (1961), pp. 337–340.

*Primary Examiner*—Alex Mazel
*Assistant Examiner*—R. J. Gallagher
*Attorney*—Ernest Y. Miller

[57] ABSTRACT

This invention describes a method of converting d(+) 6-phenyl-2,3,5,6-tetrahydroimidazo[2,1-b]thiazole into the corresponding dl compound. The latter compound is an active anthelmintic which can be resolved into the l(−) highly active component and d(+) inactive component.

10 Claims, No Drawings

RACEMIZATION OF D(+) 6-PHENYL-2,3,5,6-TETRAHYDROIMIDAZO [2,1-B]THIAZOLE

This application is a continuation-in-part of our application Ser. No. 565,101, filed July 14, 1966, now abandoned.

This invention relates to a method for the conversion of a physiologically inactive isomer to an active isomer.

In the copending application of one of us Ser. No. 716,353, filed Mar. 27, 1968, now abandoned which is continuation-in-part of application Ser. No. 493,231, filed Oct. 5, 1965, now abandoned there is described and claimed a method for the preparation of dl 6-phenyl-2,3,5,6-tetrahydroimidazo[2,1-b]thiazole which was found to be a highly active anthelmintic. The problem of separating the l(active) and d (inactive) isomers presented itself. This problem was solved by the method of separating the 2 isomers described and claimed in the copending application of one of us Ser. No. 691,710, filed Dec. 19, 1967, now U.S. Pat. No. 3,463,786 which is a continuation-in-part of application Ser. No. 554,307, filed June 1, 1966, now abandoned. The latter application describes a highly effective process for preparing d(+) 6-phenyl-2,3,5,6-tetrahydroimidazo[2,1-b]thiazole and l(−) 6-phenyl-2,3,5,6-tetrahydroimidazo[2,1-b]thiazole from dl 6-phenyl-2,3,5,6-tetrahydroimidazo-[2,1-b]thiazole. Since only the levo rotary isomer has useful anthelmintic activity and since the d(+) isomer is produced as a by-product in essentially equal amounts in the preparation of the highly active l(−) isomer, there is substantial economic advantage in racemizing the ineffective dextro rotary isomer to dl 6-phenyl-2,3,5,6-tetrahydroimidazo[2,1-b]thiazole which in turn can be resolved into its (d) and (l) forms.

We have now found a two-step process of racemization followed by resolution which makes it possible to convert d(+) 6-phenyl-2,3,5,6-tetrahydroimidazo[2,1-b]thiazole to l(−) 6-phenyl-2,3,5,6-tetrahydroimidazo[2,1-b]thiazole. The process is shown graphically below.

d(+) base $\xrightarrow{Racemization}$ dl base $\xrightarrow{resolution}$ l(−) + d(+)

The resolution of dl 6-phenyl-2,3,5,6-tetrahydroimidazo[2,1-b]thiazole with d-10-camphorsulfonic acid and chloroform yields d(+) 6-phenyl-2,3,5,6-tetrahydroimidazo[2,1-b]-thiazole d-10-camphorsulfonate which is recovered by filtration. The mother liquor contains the l(−) 6-phenyl-2,3,5,6-tetrahydroimidazo[2,1-b]-thiazole d-10-camphorsulfonate which is recovered by evaporation of the solvent followed by treatement with hot acetone and filtration of the crystalline product. This product is then treated with water and sodium hydroxide and extracted with chloroform. Evaporation of the solvent yields the l(−) 6-phenyl-2,3,5,6-tetrahydroimidazo[2,1-b]thiazole which is extremely effective for controlling helminths in warm-blooded animals.

The resolution of dl 6-phenyl-2,3,5,6-tetrahydroimidazo[2,1-b]thiazole with d-10-camphorsulfonic acid yields a solvate containing d(+) 6-phenyl-2,3,5,6-tetrahydroimidazo-[2,1-b]thiazole d-10-camphorsulfonate. This compound may then be converted to d(+) 6-phenyl-2,3,5,6-tetrahydroimidazo[2,1-b]-thiazole by treating the same with water and sodium hydroxide followed by extraction with chloroform and evaporation of the solvent.

The latter compound is a difficult compound to racemize. It does not have a carbonyl, nitrile or other electronegative group on a carbon adjacent to the assymetric 6-carbon atom.

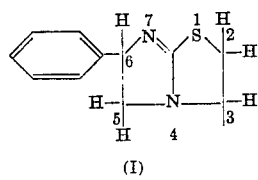

(I)

and therefore cannot enolize to produce a double bond at this location when placed in contact with acids or bases. When placed in acidic solutions, a salt is formed which has the structure (II) as follows:

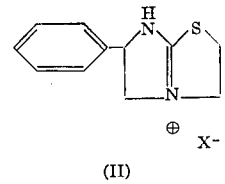

(II)

These salts are optically stable and the product can be recovered, unracemized and undegraded after dissolving in warm concentrated sulfuric acid. When a salt represented by formula (II) is heated with or without a solvent, there is no conversion of the optically active form to the racemic form but only to degradation products of unknown composition. When the compound is contacted with alkali metal hydroxides or carbonates, it undergoes a degradation to (III) instead of a racemization.

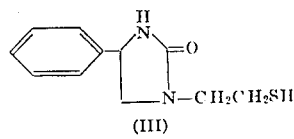

(III)

When 6-phenyl-2,3,5,6-tetrahydroimidazo[2,1-b]thiazole is dissolved in dry dimethyl sulfoxide and treated with a molar excess of potassium t-butylate, it is almost immediately converted to a degradation product (IV) in excellent yield.

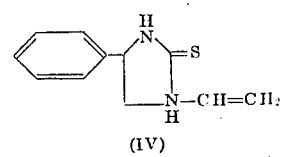

(IV)

The optically active intermediate is recovered unchanged when treated with lithium diethylamide in diethyl amine. Thus, it would appear that it would be impossible to racemize the optically active compound because conditions that have in the past caused racemization in this instance, either gave no reaction, or caused the compound to be converted to a useless by-product. However, we have surprisingly found a novel method of effecting the racemization in high yield without the formation of any significant amount of unwanted by-products. When the optically active compound is placed in an inert solvent and contacted with a catalytic amount of a very powerful base, a small equilibrium amount of an anion of the structure (V) is formed.

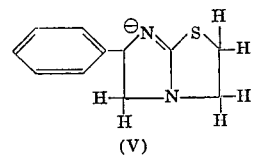

(V)

This intermediate cannot be optically active since it has only three bonds attached to the optically active 6-carbon atom. Obviously, any base that will cause even a trace amount of compound (V) will cause complete racemization.

Non-aqueous bases such as alkali metal alkoxides, especially potassium t-butoxide; alkali metal amides, and sodium hydride are best suited for this application. Inert solvents (inert toward solvolyzing the optically active compound and inert toward the decomposition of the non-aqueous base) are useful in that they dissolve some of the base and permit it to react faster with the optically active substrate. Aromatic hydrocarbons, especially toluene are generally the most convenient and economical. Dimethyl formamide is a highly desirable solvent since most of the non-aqueous bases have some solubility in it. Mixtures of dimethyl formamide and hydrocarbons are very effective with potassium t-butylate as the base. Dimethyl sulfoxide has the ability to react with sodium hydride and sodamide to form an anion of the solvent having structure (VI). This compound (VI)

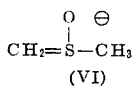

(VI)

is a non-aqueous base which is capable of causing racemization. This base is soluble in mixtures of dimethyl sulfoxide and hydrocarbons and is a preferred base to effect the racemization. Thus, it can be seen that a limited variety of solvents, solvent combinations and non-aqueous bases can be used provided that the solvent does not destroy the base nor solvolyze (degrade) the products. Water, primary and secondary alcohols, halogenated compounds, esters, etc., have no utility in this process. Nor can aqueous or alcoholic solutions of alkali metal hydroxides or carbonates be used. On the other hand, butyl lithium and phenyl lithium are operable as are potassium amides, and potassium hydride although they offer no advantage over other bases discussed above. The racemization is preferably carried out at a temperature between about 20° and 120° C., however, temperatures as low as −50° C. and as high as 250° C. can be used. The reaction may be completed in a very short period of time, as for example, several minutes or it may be carried out over an extended period, for example, as long as twelve hours. Moreover, it has been found that when the racemization is conducted in the absence of solvent, a temperature above the melting point of the reactants is necessary. Therefore, it is generally most practical under these conditions to conduct the reaction between about 80° and 250° C. When solvent is used temperatures as low as −50° C. are effective but as suggested above, 20° to 120° C. is preferred.

Briefly then, in the practice of the present invention, bases which may be employed have a basic strength equal to or greater than sodium methoxide. Preferred bases are selected from the group consisting of alkali metal alkoxides such as sodium, potassium and lithium alkoxides having from one to 10 carbon atoms; alkali metal amides such as the sodium, potassium and lithium amides of the formula (alkali metal

wherein $R_1$ and $R_2$ represent hydrogen or a lower alkyl radical of one to four carbon atoms; alkali metal hydrides selected from the group consisting of sodium, potassium and lithium hydride; organometallic compounds selected from the group consisting of phenyl lithium and butyl lithium; and alkali metal alicyclic and lower alkyl ($C_1$–$C_4$) aliphatic sulfoxide salts including the sodium, potassium and lithium salts of dimethylsulfoxide.

Inert solvents which may be employed in the process of this invention include the monocyclic aromatic hydrocarbons having from six to 10 carbon atoms, such as toluene, benzene and xylene; aliphatic hydrocarbons having from five to 10 carbon atoms; cycloaliphatic hydrocarbon having from five to nine carbon atoms such as cyclohexane and cyclopentane; lower alkyl amides having the formula

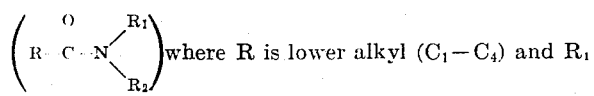

and $R_2$ are hydrogen or a one to four carbon atom lower alkyl; dimethylsulfoxide; and dimethyl or diethyl formamide or acetamide.

Although the emphasis is on racemizing the d(+) or inactive isomer, the process is operable with the l(−) isomer should it be desirable to convert the l form to the dl form. The racemization of either form is included in this invention.

The following examples illustrate the process of preparing (dl) and subsequently (d) and (l) isomers.

EXAMPLE 1

A mixture is prepared from 300 milligrams d(+) 6-phenyl-2,3,5,6-tetrahydroimidazo[2,1-b]thiazole; 20 milliliters dimethyl sulfoxide; and 0.5 grams of a 50 percent sodium hydride mineral oil dispersion. After standing overnight at room temperature, the suspension is poured into water and the dl 6-phenyl-2,3,5,6-tetrahydroimidazo[2,1-b]thiazole recovered by extraction of the water mixture with methylene chloride. The methylene chloride extract is dried over anhydrous potassium carbonate and evaporated. The residue is dissolved in ether and isopropanolic hydrogen chloride is added. The precipitated hydrochloride, which is recovered by filtration, weighs 280 milligrams and melts at 260°–263°. The product has a specific rotation of +10.5° indicating that it is approximately 95 percent racemized dl 6-phenyl-2,3,5,6-tetrahydroimidazo[2,1-b]thiazole hydrochloride.

EXAMPLE 2

A mixture of 200 milligrams d(+) 6-phenyl-2,3,5,6-tetrahydroimidazo[2,1-b]thiazole and 50 milligrams of potassium t-butylate is heated in an oil bath at 100° for 2 hours. The product is partitioned between methylene chloride and water. The methylene chloride layer is separated and dried over anhydrous potassium carbonate and the rotation measured in a polarimeter. The rotation is zero indicating complete racemization. The methylene chloride is evaporated and the residue dissolved in acetone. The hydrochloride is prepared by adding some isopropanolic hydrogen chloride to the solution. The precipitated hydrochloride is recovered by filtration. The yield is 145 milligrams (62 percent) of dl 6-phenyl-2,3,5,6-tetrahydroimidazo[2,1-b]thiazole hydrochloride, melting point 262°.

EXAMPLE 3

A solution is prepared by dissolving 200 milligrams of potassium t-butylate in approximately 8 milliliters of dimethyl formamide. Now 2 grams of d(+) 6-phenyl-2,3,5,6-tetrahydroimidazo[2,1-b]thiazole is added. The reaction mixture becomes cold as the amine dissolves. After the solid has dissolved (approximately 10 minutes) the rotation of the solution is taken and observed to be only 2°. The rotation of an unracemized solution of the same concentration would be about 30°. After 30 minutes, the reaction mixture is poured into water. The precipitated free base is recovered by filtration and washed with water. This product weighs 0.52 grams and melting point 88°–89° C. Additional material is obtained from the material in the polarimeter tube and by extracting the filtrates with methylene chloride. All fractions of the free base are combined and converted to the hydrochloride by treating an acetone solution with isopropanolic hydrogen chloride. The yield of dl 6-phenyl-2,3,5,6-tetrahydroimidazo[2,1-d]thiazole hydrochloride, melting point 264°–266° C., is 1.67 grams, 68 percent.

EXAMPLE 4

A suspension is made of 4 milliliters dimethyl formamide and 100 milligrams of sodium methylate. Now 1 gram of d(+) 6-phenyl-2,3,5,6-tetrahydroimidazo[2,1-b]thiazole is dissolved in the mixture. After the nearly insoluble sodium methylate has settled, the clear supernatant liquid gives a reading of +31° in a 2 dm. polarimeter tube. The reaction mixture is heated in an oil bath at 108° C. for 6 hours. At this time, the rotation is observed to be +13.5°. The reaction mixture is heated an additional six hours at the same temperature. The rotation now reads +8°. The reaction mixture is poured into water and the product recovered by extraction with methylene chloride. The methylene chloride is evaporated and the residue converted to the hydrochloride with acetone and isopropanolic hydrogen chloride. The yield of dl 6-phenyl-2,3,5,6-tetrahydroimidazo[2,1-b]-thiazole hydrochloride, melting point 259°–263°, is 0.46 grams. A determination of the specific rotation showed that the product is essentially 100 percent racemized.

EXAMPLE 5

A suspension is made up of 4 milliliters of dimethyl sulfoxide and 100 milligrams sodium methylate. Now 1 gram of d(+) 6-phenyl-2,3,5,6-tetrahydroimidazo[2,1-b]thiazole is dissolved in the mixture. The clear supernatant liquid above the relatively insoluble sodium methylate has an observed rotation of +34° when read in a 2 decimeter tube. The mixture is heated in an oil bath at 108° for 6 hours. At this time the rotation has dropped to +8° 40'. After heating an additional 6 hours, the rotation reads +5 30'. The hydrochloride is prepared as in Example 4. The yield is 0.42 grams of product melting point 259°–261° C. A determination of the specific rotation showed that the product is essentially completely racemized.

EXAMPLE 6

A solution of 2 grams (9.8 millimoles) of d(+) 6-phenyl-2,3,5,6-tetrahydroimidazo[2,1-b]thiazole in 20 milliliters of benzene is treated with 2 milliliters (3.2 millimoles) of butyl lithium-hexane solution. After standing 2 days, the benzene is decanted from a dark solid and evaporated leaving 1.4 grams of sticky solid. The solid is washed with triethyl amine and dissolved in acetone. Addition of a small amount of isopropanolic hydrogen chloride precipitates the hydrochloride, melting point 257°–260° C. The yield is 200 milligrams. The specific rotation is observed to be +6.3° showing that the product is almost completely racemized.

EXAMPLE 7

A solution is prepared by dissolving about 0.5 grams of sodium amide in 25 milliliters of dimethyl sulfoxide. One milliliter of this solution is added to a solution of 1 gram of d(+) 6-phenyl-2,3,5,6-tetrahydroimidazo[2,1-b]thiazole in 8 milliliters of dimethyl sulfoxide. Within a few minutes the rotation of the solution is zero. The reaction mixture is poured into water and the product extracted with methylene chloride. The methylene chloride extract is washed with water and dried over anhydrous potassium carbonate. Evaporation of the solvent leaves 0.6 grams of dl 6-phenyl-2,3,5,6-tetrahydroimidazo[2,1-b]thiazole, melting point 87°–89° C. This is dissolved in acetone and a little isopropanolic hydrogen chloride is added. The precipitated hydrochloride is recovered by filtration and washed with acetone. The dl 6-phenyl-2,3,5,6-tetrahydroimidazo[2,1-b]thiazole hydrochloride melts 264°–265° C.

EXAMPLE 8

When in any example, 1 through 7, the chosen starting material is l(−) 6-phenyl-2,3,5,6-tetrahydroimidazo-[2,1-b]thiazole, the product obtained will be the same dl 6-phenyl-2,3,5,6-tetrahydroimidazo[2,1-b]thiazole as is obtained from the d(+) isomer.

EXAMPLE 9

A solution of 204.3 grams (1 mole) of dl 6-phenyl-2,3,5,6-tetrahydroimidazo[2,1-b]thiazole and 232.3 grams (1 mole) of d-10-camphorsulfonic acid in 1,750 milliliters of chloroform is allowed to crystallize overnight at −28° C. The solvate is recovered by filtration and washed with ice cold chloroform (400 milliliters). The solvate is dried (decomposed) under nitrogen 7 hours and then in air overnight. The yield of d(+) 6-phenyl-2,3,5,6-tetrahydroimidazo[2,1-b]thiazole d-10-camphorsulfonate is 202.5 grams (0.464 mole) 92.8 percent, melting point 139°–140°, $\alpha]_D^{25}$ +82.6 (C=16, $H_2O$).

The trisolvate separates only below its transition temperature which is about 35° C. Cooling to 0° C. is nearly as good as −28°C. It separates as fine needles which are very easy to filter and wash. The solubility in chloroform is only 0.34 grams per 100 milliliters at 0° C. The solvate becomes sticky in air on humid days but can be dried in a steam or air on dry days. It dries to the non-solvated, apparently anhydrous, salt. The solvate melts about 35° C. and is soluble in methylene chloride and in acetone. It can be recrystallized from 2 milliliters or less per gram of chloroform with a recovery of 95 percent. Recrystallized material melts at 140°–141° C. and has $\alpha]_D^{25}$ +83 (C=15, $H_2O$).

Following the procedure above and substituting l-10-camphorsulfonic acid for d-10-camphorsulfonic acid yields the l(−) 6-phenyl-2,3,5,6-tetrahydroimidazo[2,1-b]thiazole l-10-camphorsulfonate.

The mother liquor from which the salt is prepared above is taken and is evaporated to a syrup. The syrup which is approximately one-half chloroform by weight is treated with 1,500 milliliters of hot acetone. The resulting solution is kept near the boiling point for 10 minutes during which time the solid crystallizes out. The crystals are collected by filtering the hot solution. The material on the filter is washed with 200 milliliters of hot acetone and dried. This salt weight 24.2 grams (0.055 mole) and melts at 186°–192° $\alpha]_D^{25}$ −14.7 (C=16, $H_2O$). It is not an optically pure salt and can be resolved by recrystallization from chloroform. The mother liquor (acetone filtrate) is stored at −15° C. overnight. The crystalline product is recovered by filtration and washed with 150 milliliters of cold acetone. The yield of this l(−) 6-phenyl-2,3,5,6-tetrahydroimidazo-[2,1-b]thiazole d-10-camphorsulfonate is 168.1 grams (0.385 mole), 77 percent, melting point 130°–132° $\alpha]_D^{25}$ −54.7 (c=16, $H_2O$).

A solution is made by dissolving 158.1 grams (0.36 mole) of l(−) 6-phenyl-2,3,5,6-tetrahydroimidazo[2,1-b]-thiazole d-10-camphorsulfonate in 400 milliliters of water. The solution is clarified by treating with a little activated charcoal and filtering. The salt is decomposed by adding a solution of 16.3 grams (0.4 mole)of 98 percent sodium hydroxide in 100 milliliters of water. The free base is recovered by three extractions with chloroform. The chloroform extracts are combined, washed with water and with saturated sodium chloride solution, and dried over magnesium sulfate. Evaporation of the solvent left 75 grams of the free base l(−) 6-phenyl-2,3,5,6-tetrahydroimidazo[2,1-b]thiazole having a melting point 60°–61.5° C. and an optical rotation $\alpha]_D^{25}$ −85.1° (C=10, $CHCl_3$).

EXAMPLE 10

A solution of d(+) 6-phenyl-2,3,5,6-tetrahydroimidazo[2,1-b]thiazole in dry toluene is mixed with a small amount of potassium t-butylate and heated at the boiling point. After a short time, the compound is found to be racemized.

EXAMPLE 11

When the process is Example 10 is carried out with added dimethylformamide, the racemization is found to proceed at a more rapid rate.

EXAMPLE 12

Following the procedure of Example 7, sodium hydride is dissolved in dimethylsulfoxide. This mixture is then added to a solution d(+) 6-phenyl-2,3,5,6-tetrahydroimidazo[2,1-b]-thiazole in toluene. The reaction mixture is stirred at 0° C. until racemization has taken place and then permitted to warm to room temperature after which it is poured into water, extracted as in Example 7 with methylene chloride, washed and dried to yield the dl-6-phenyl-2,3,5,6-tetrahydroimidazo [2,1-b]-thiazole.

EXAMPLE 13

Following the procedure of Example 5 d(+) 6-phenyl-2,3,5,6-tetrahydroimidazo[2,1-b]thiazole is racemized to dl-6-phenyl-2,3,5,6-tetrahydroimidazo[2,1-b]thiazole by heating the d(+) 6-phenyl-2,3,5,6-tetrahydroimidazo[2,1-b]thiazole in a mixture of toluene and dimethylacetamide in the presence of sodium amide. The mixture is heated at about 80° C. until the racemized product is obtained.

This procedure is repeated using benzene as a substitute for toluene and heating the reaction mixture to reflux which produces the desired dl compound.

EXAMPLE 14

Example 2 is repeated except that the mixture is heated at 250° C. until the reaction is complete. The d(+) 6-phenyl-2,3,5,6-tetrahydroimidazo[2,1-b]thiazole is racemized to the dl -6-phenyl-2,3,5,6-tetrahydroimidazo[2,1-b]thiazole, which is recovered as described in Example 2.

We claim:

1. A method of producing dl 6-phenyl-2,3,5,6-tetrahydroimidazo[2,1-b]thiazole comprising contacting d(+) 6-phenyl-2,3,5,6[2,1-b]-thiazole with a strong non-aqueous base selected from the group consisting of alkali metal alkoxides of from one to 10 carbon atoms; alkali metal amides having the formula

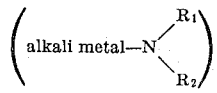

wherein $R_1$ and $R_2$ are selected from the group consisting of hydrogen and lower alkyl ($C_1$—$C_4$); alkali metal hydrides selected from the group consisting of sodium, potassium and lithium; butyl lithium; phenyl lithium; and alkali metal, lower alkyl ($C_1$—$C_4$) sulfoxide salts, the reaction being carried out at a temperature between about −50° C. and +250° C.

2. In a process of producing l(−) 6-phenyl-2,3,5,6-tetrahydroimidazo[2,1-b]thiazole from d(+) 6-phenyl-2,3,5,6-tetrahydroimidazo[2,1-b]thiazole, the step which comprises contacting for a period of a few minutes to about 12 hours d(+) 6-phenyl-2,3,5,6-tetrahydroimidazo-[2,1-b]thiazole with a compound selected from the group consisting of alkali metal alkoxides of one to 10 carbon atoms; alkali metal amides of the formula

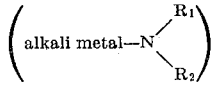

where $R_1$ and $R_2$ are selected from the group consisting of hydrogen and lower alkyl ($C_1$—$C_4$); alkali metal hydrides; phenyl lithium; butyl lithium and alkali metal, lower alkyl ($C_1$—$C_4$) sulfoxide salts, to produce dl 6-phenyl-2,3,5,6-tetrahydroimidazo[2,1-b]thiazole, the reaction being carried out at a temperature between about −50°C. and +250°C.

3. A method according to claim 1, wherein the reaction is carried out in the presence of a solvent selected from the group consisting of monocyclic aromatic hydrocarbons ($C_6$—$C_{10}$); aliphatic hydrocarbons of five to 10 carbon atoms; cycloaliphatic hydrocarbons ($C_5$-$C_9$); lower alkyl amides of the formula

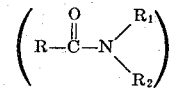

where R is lower alkyl (C—$c_4$) and $R_1$ and $R_2$ are hydrogen or lower alkyl ($C_1$—$C_4$); dimethylsulfoxide; dimethyl formamide; diethyl formamide and acetamide.

4. A method in accordance with claim 1, wherein the strong non-aqueous base is an alkali metal amide or alkali metal hydride and the reaction is carried out in the presence of dimethylsulfoxide.

5. A method in accordance with claim 1, wherein the strong non-aqueous base is an alkali metal hydride.

6. A method in accordance with claim 1, wherein the strong non-aqueous base is an alkali metal amide.

7. A method in accordance with claim 1, wherein the strong non-aqueous base is an alkali metal alkoxide.

8. A method according to claim 2, wherein the reaction is carried out in the presence of a solvent selected from the group consisting of monocyclic aromatic hydrocarbons ($C_6$—$C_{10}$); aliphatic hydrocarbons of five to 10 carbon atoms; cycloaliphatic hydrocarbons ($C_5$ to $C_9$); lower alkyl amides of the formula

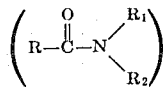

where R is lower alkyl ($C_1$—$C_4$) and $R_1$ and $R_2$ are hydrogen or lower alkyl ($C_1$—$C_4$); dimethylsulfoxide; diethyl formamide; dimethyl formamide and acetamide.

9. A method according to claim 3, wherein the solvent is a dilower alkyl ($C_1$—$C_4$) loweralkyl amide or dimethylsulfoxide.

10. A method of producing dl 6-phenyl-2,3,5,6-tetrahydroimidazo[2,1-b]thiazole comprising contacting d(+) 6-phenyl-2,3,5,6[2,1-b]-thiazole with a strong non-aqueous base having a basic strength equal to or greater than sodium methoxide and selected from the group consisting of alkali metal alkoxides of from one to 10 carbon atoms; alkali metal amides having the formula

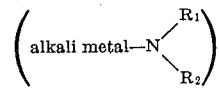

wherein $R_1$ and $R_2$ are hydrogen or lower alkyl ($C_1$—$C_4$); sodium hydride; potassium hydride; lithium hydride; butyl lithium; phenyl lithium and alkali metal loweralkyl ($C_1$—$C_4$) sulfoxide salts, at a temperature within the range of from about 20° to 120°C.

* * * * *